(12) United States Patent
Taniguchi (10) Patent No.: US 9,197,103 B2
(45) Date of Patent: Nov. 24, 2015

(54) STATOR CORE FOR ELECTRIC ROTARY APPARATUS

(71) Applicant: DENSO CORPORATION, Kariya, Aichi-pref. (JP)

(72) Inventor: Makoto Taniguchi, Obu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/311,786

(22) Filed: Jun. 23, 2014

(65) Prior Publication Data

US 2015/0061453 A1    Mar. 5, 2015

(30) Foreign Application Priority Data

Sep. 3, 2013   (JP) .................................. 2013-181942

(51) Int. Cl.
*H02K 1/16* (2006.01)
*H02K 1/14* (2006.01)
*H02K 1/18* (2006.01)

(52) U.S. Cl.
CPC ................ *H02K 1/165* (2013.01); *H02K 1/148* (2013.01); *H02K 1/185* (2013.01)

(58) Field of Classification Search
CPC ....... H02K 1/148; H02K 1/185; H02K 3/522; H02K 1/165
IPC .................................. H02K 1/148,1/185, 3/522
See application file for complete search history.

(56) References Cited

U.S. PATENT DOCUMENTS

| | | | | |
|---|---|---|---|---|
| 1,255,606 | A * | 2/1918 | Hensley | 310/40 R |
| 2,236,291 | A * | 3/1941 | Kilbourne | 310/216.061 |
| 3,983,435 | A * | 9/1976 | Sims | 310/216.003 |
| 4,392,072 | A * | 7/1983 | Rosenberry | 310/216.067 |
| 4,546,282 | A * | 10/1985 | Hartwig | 310/216.063 |
| 5,300,845 | A * | 4/1994 | Fanning et al. | 310/216.061 |
| 2004/0183393 | A1 * | 9/2004 | Suzuki et al. | 310/218 |
| 2011/0101816 | A1 | 5/2011 | Kondou et al. | |

FOREIGN PATENT DOCUMENTS

JP   2011-097769 A   5/2011

\* cited by examiner

*Primary Examiner* — Dang Le (57) ABSTRACT

A stator core includes a yoke member and a teeth member. The yoke member is in an annular shape. The teeth member includes teeth and connecting portions. The teeth are projected from the yoke member radially inward. The teeth are formed of a steel plate stacked along a circumferential direction. At least one of the connecting portions connects a part of a tip end of one of the teeth in an axial direction with a part of a tip end of an other of the teeth in the axial direction. The one of the teeth and the other of the teeth are adjacent to each other in the circumferential direction.

7 Claims, 9 Drawing Sheets

STATOR CORE FOR ELECTRIC ROTARY APPARATUS

CROSS REFERENCE TO RELATED APPLICATION

This application is based on reference Japanese Patent Application No. 2013-181942 filed on Sep. 3, 2013, the disclosure of which is incorporated herein by reference.

TECHNICAL FIELD

The present embodiment relates to an electric rotary apparatus.

BACKGROUND

A conventional stator core may be manufactured by stacking multiple plate members. Each plate member may include an annular portion and multiple projections. The multiple projections may be projected inward from the annular portion. Each annular portion may form a yoke. Each projection may form a tooth. The conventional stator core may need a lead wire to be inserted from the inside of the teeth when the lead wire is wound.

Another stator core may include a yoke and teeth, which are separate components. In this stator core, a lead wire may be wound around the teeth, and thereafter, the teeth and the yoke may be fixed together. This configuration of the stator core may enable the lead wire to be inserted to the teeth from the outside, when the lead wire wound around. Therefore, this configuration of the stator core may enable to employ, for example, a rectangular wire as the lead wires to form a high-density stator in a form of distributed winding, thereby to enable to reduce noise and oscillation.

As disclosed in Patent Document 1, in consideration of the teeth being a laminated object, this configuration of the stator core may need a bridge to tie ends of the teeth at the radially inside. For example, in a configuration with a large number is slots, each of the teeth may become thinner. In this case, crimping and welding may be hard to be implemented on the laminated object forming the teeth, without the bridge.

Patent Document 1

Publication of Unexamined Japanese Patent Application No. 2011-097769

In the configuration, in which the ends of the teeth are connected by using the bridge at the radially inside, magnetic flux may short-circuit through the bridge when the rotary electric apparatus is in operation. Consequently, disorder may occur in magnetic flux in a gap between the stator and the rotor. As a result, pulsation may occur in torque.

Pulsation in torque may decrease in a configuration in which the bridge is formed thinner as much as possible. In a case where the bridge is formed thinner as much as possible, precise manufacturing is required to press-form the teeth with the bridge from a plate member. In addition, reduction in rigidity of the teeth and the bridge may be concerned when the teeth and the bridge are equipped to the yoke. In this configuration, the teeth may be deformed due to reduction in rigidity.

SUMMARY

It is an object of the present disclosure to produce a stator core for a rotary electric apparatus, configured to enable to reduce noise and oscillation thereby to reduce pulsation in torque.

According to one aspect of the present disclosure, a stator core is for a stator of a rotary electric apparatus. The stator core comprises a yoke member substantially being in an annular shape. The stator core further comprises a teeth member including a plurality of teeth and a plurality of connecting portions. The teeth are projected from the yoke member radially inward. The teeth are formed of a steel plate stacked along a circumferential direction. At least one of the connecting portions connects a part of a tip end of one of the teeth in an axial direction with a part of a tip end of an other of the teeth in the axial direction. The one of the teeth and the other of the teeth are adjacent to each other in the circumferential direction.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

As follows, embodiments of the present disclosure will be described with reference to drawings.

First Embodiment

Figure 1:
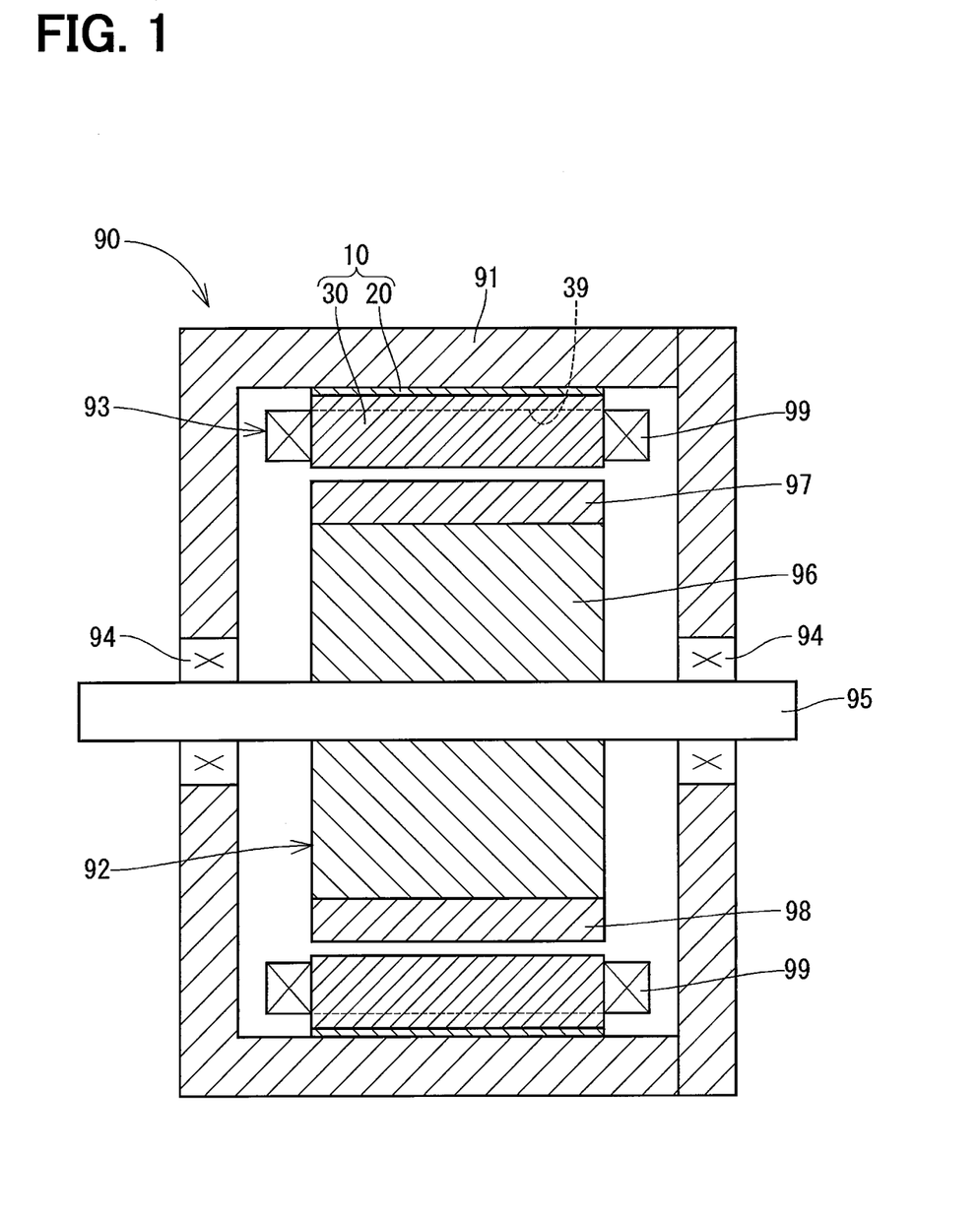
FIG. 1 is a sectional view showing a motor including a stator core according to a first embodiment of the present disclosure.

FIG. 1 shows a motor 90 equipped with a stator 93 according to a first embodiment of the present disclosure. The motor 90 is a three phase brushless motor employed as a power source of a vehicular electric power steering. The motor 90 includes a housing 91, a rotor 92, and the stator 93.

The rotor 92 includes a rotation axis 95, a rotor core 96, and multiple permanent magnets 97 and 98. The rotation axis 95 is rotatably supported by the housing 91 via bearings 94. The rotor core 96 is press-fitted to the rotation axis 95. The permanent magnets 97 and 98 are equipped to the rotor core 96. The rotor 92 according to the present embodiment may have, for example, 20 poles. The stator 93 has a stator core 10 and a stator winding 99. The stator core 10 is in a tubular shape and is located on the radially outside relative to the rotor 92. The stator core 10 is fixed to an inner wall of the housing 91. The stator winding 99 is wound around the stator core 10.

Figure 2:
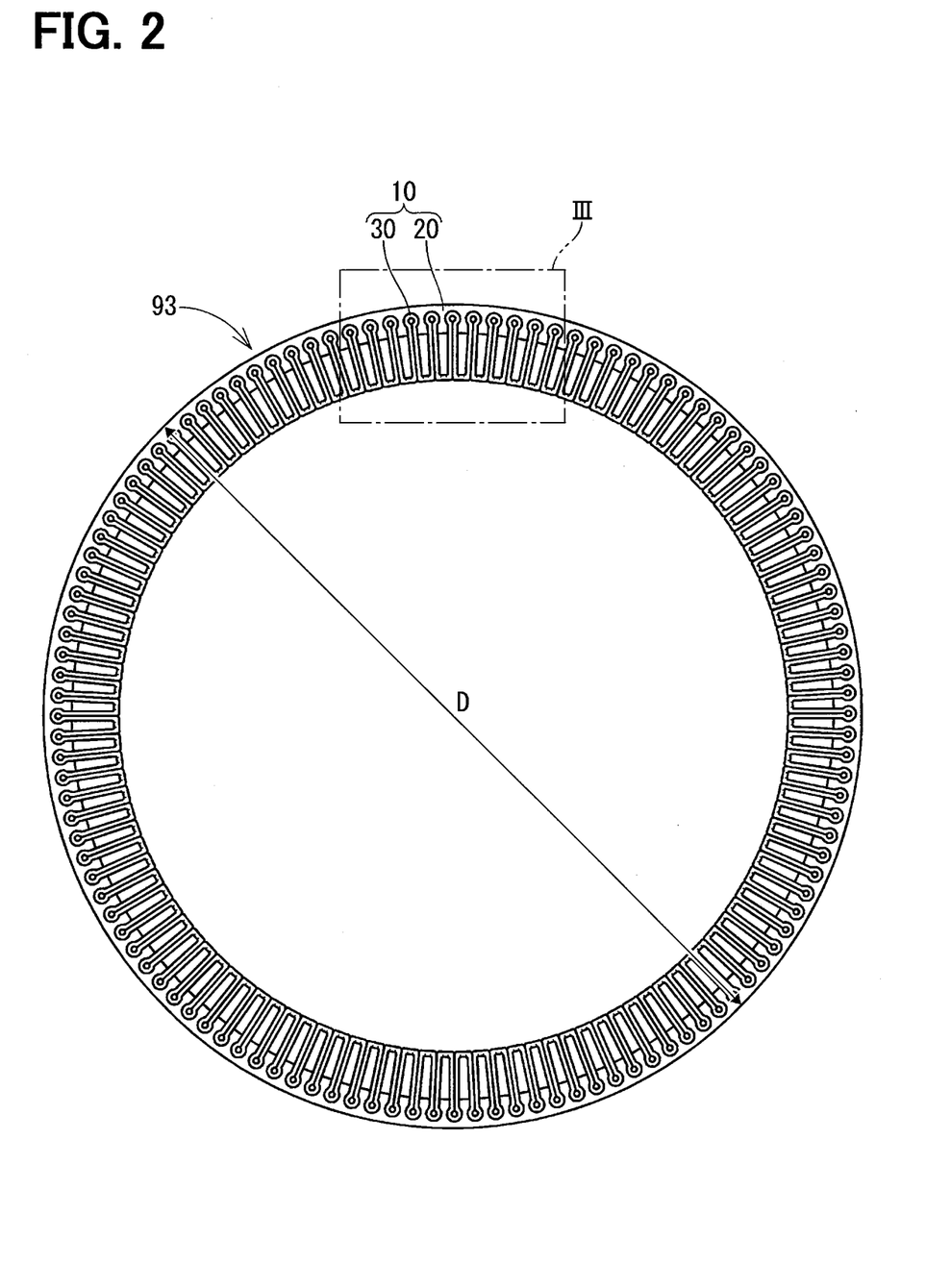
FIG. 2 is a view showing the stator core when being viewed along an axial direction in FIG. 1.
Figure 3:
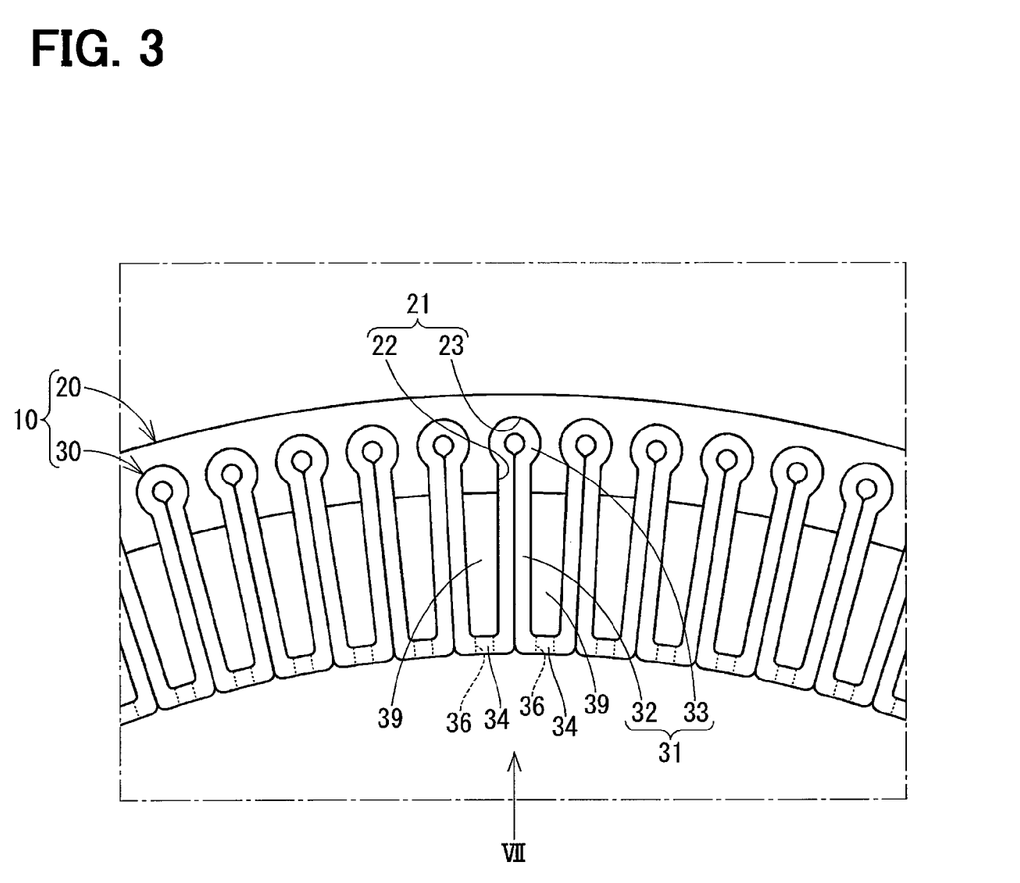
FIG. 3 is an enlarged view showing a portion of the stator core surrounded by a frame III in FIG. 2.

Subsequently, the stator core 10 will be described with reference to FIGS. 2 to 9. For easy understanding, FIGS. 2 and 3 do not illustrate the stator winding 99. As shown in FIGS. 2 and 3, the stator core 10 includes a yoke member 20 and a teeth member 30. The yoke member 20 is in a tubular shape. The yoke member 20 is a laminated object including soft magnetic steel plates, which are laminated in the axial direction. In the present embodiment, the yoke member 20 is formed of, for example, a singular soft magnetic steel plate, which is rolled in a spiral form and stacked.

The yoke member 20 has an inner wall defining multiple grooves 21, which extend in the axial direction. The grooves 21 are arranged in a circumferential direction and may be formed at constant angular intervals. The groove 21 has a narrow portion 22 and a deep portion 23. The narrow portion 22 has a width in the circumferential direction, and the width of the narrow portion 22 is smaller than a width of the deep portion 23 in the circumferential direction. A number of the grooves 21 is the same as a number of teeth 31 of the teeth member 30. The yoke member 20 has an outer diameter D (mm). The number of the grooves 21 is a groove number K. The outer diameter D and the groove number K is set, such that a number (ratio) K/D is 1 or more. According to the present embodiment, the outer diameter D is 110 (mm), and the groove number K is 120.

Figure 4:
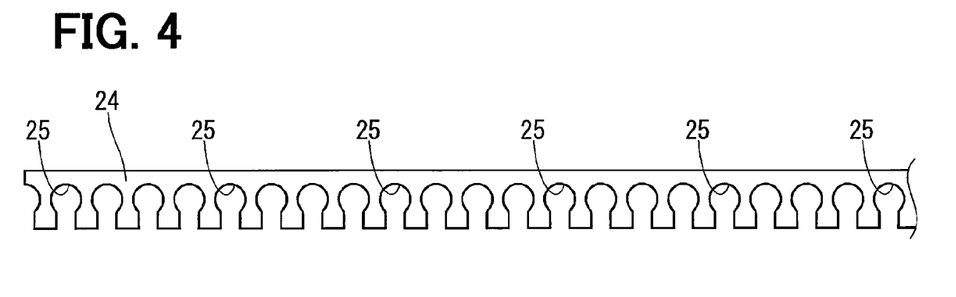
FIG. 4 is an explanatory view showing a first stage of a process to manufacture a yoke member in FIG. 2.
Figure 5:
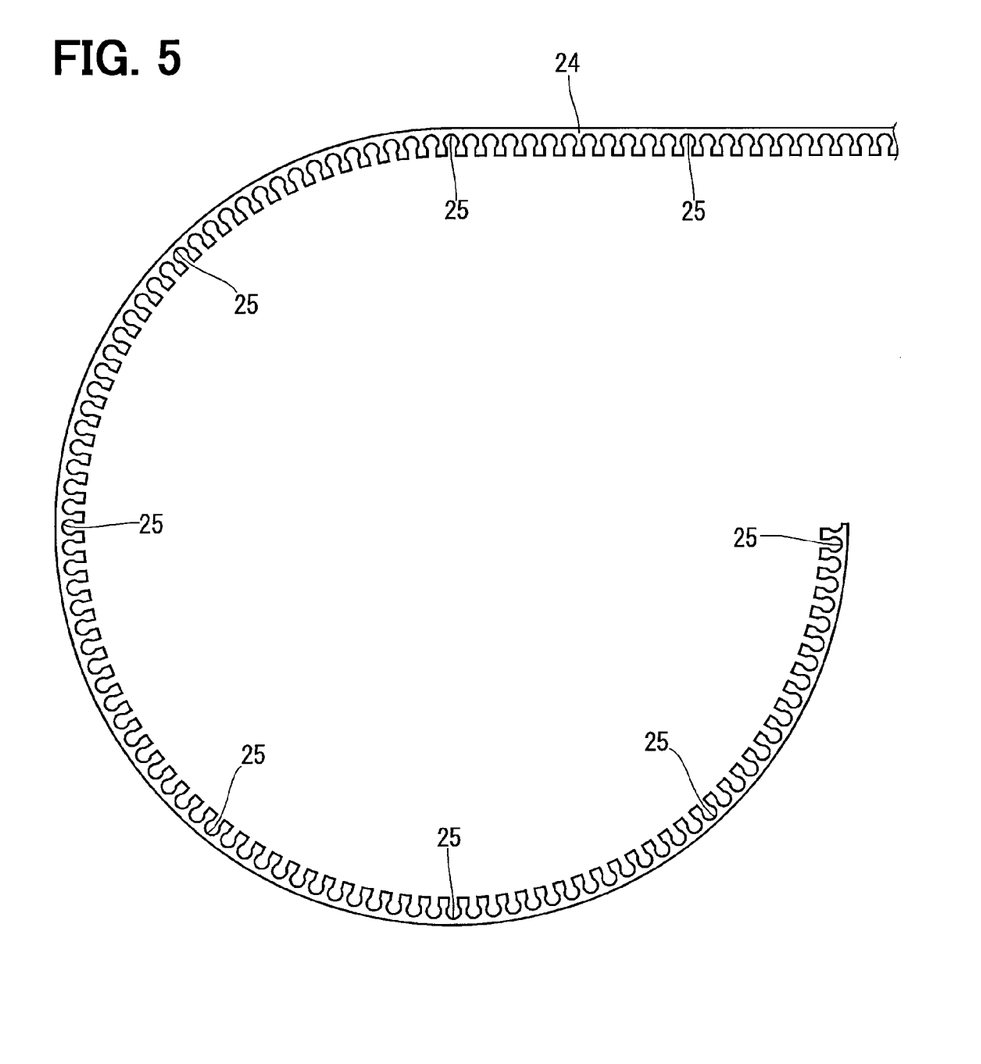
FIG. 5 is an explanatory view showing a second stage of the process to manufacture the yoke member in FIG. 2.
Figure 6:
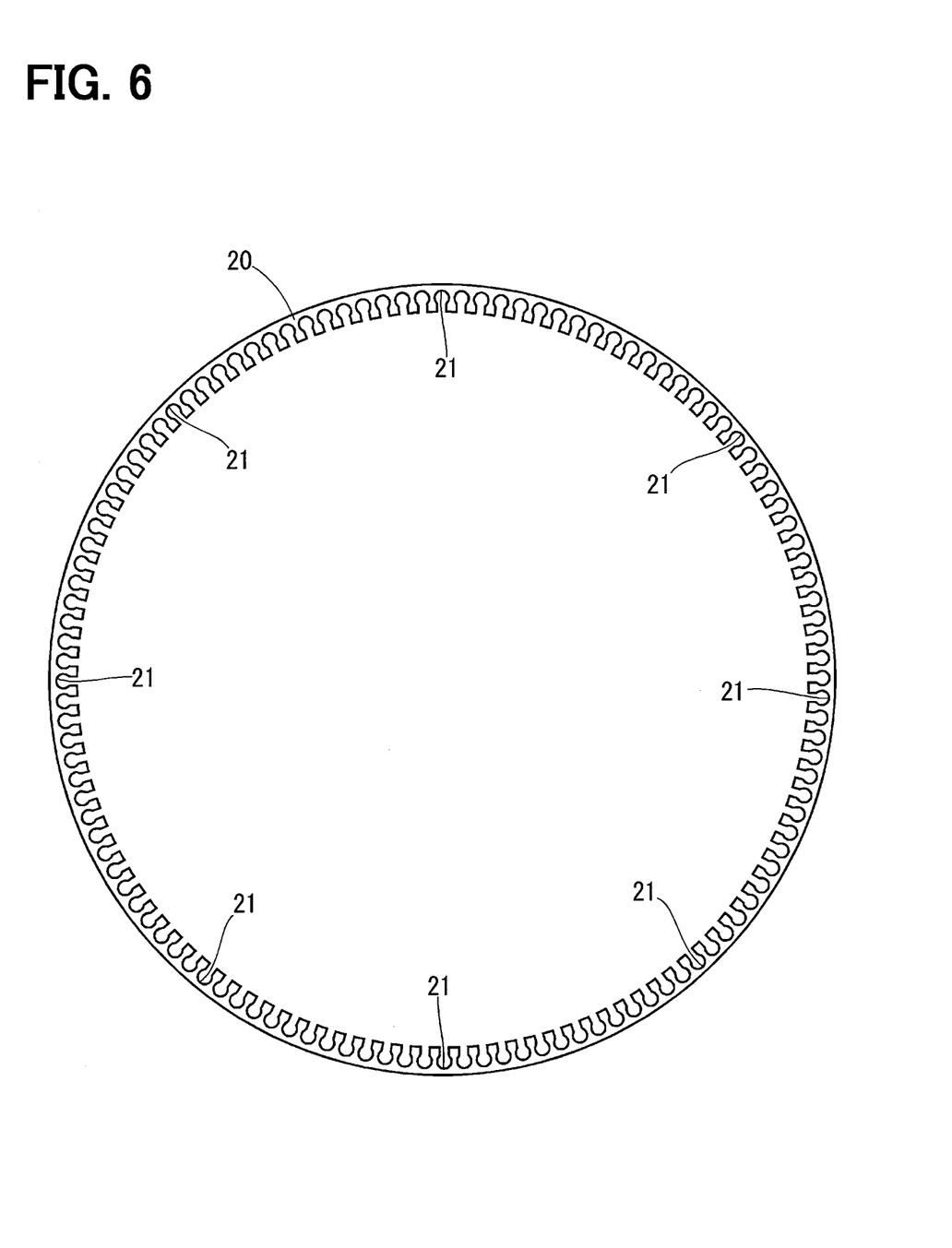
FIG. 6 is an explanatory view showing a third stage of the process to manufacture the yoke member in FIG. 2.

As follows, a manufacturing method for the yoke member 20 will be described. As shown in FIG. 4, notches 25 are formed on one end of a strip-shaped steel plate 24 in a width direction. Each of the notches 25 has a sectional shape, which is substantially the same as a sectional shape of the groove 21 (refer to FIG. 3). The notches 25 are formed at predetermined intervals in a longitudinal direction. Subsequently, as shown in FIG. 5, the strip-shaped steel plate 24 is bent, such that a side of the strip-shaped steel plate 24 in the width direction, on which the notches 25 are formed, is directed inward. As shown in FIG. 6, the strip-shaped steel plate 24 is wound in the spiral form and is stacked up. Subsequently, an end of the strip-shaped steel plate 24 is fixed by, for example, crimping, welding, and/or the like. Thus, manufacturing of the yoke member 20 is completed.

Referring back to FIGS. 2 and 3, the teeth member 30 is a separate component from the yoke member 20. The teeth member 30 includes the multiple teeth 31 and multiple connecting portions 34. Each of the teeth 31 is radially projected from the yoke member 20 inward in the radial direction. The teeth 31 are a laminated object, which is formed by stacking soft magnetic steel plates in the circumferential direction. In the present embodiment, each of the teeth 31 is formed of a singular soft magnetic steel plate, which is bent in a form of two layers including a first layer and a second layer.

Each of the teeth 31 has a layered portion 32 at which the first layer and the second layer are tightly in contact with each other. Each of the teeth 31 has a bent portion 33 at which the first layer and the second layer are not tightly in contact with each other. Specifically, at the bent portion 33, the first layer and the second layer form a clearance therebetween. With the present configuration of the teeth 31, the bent portion 33 is greater than the layered portion 32 in the width in the circumferential direction. A part of the layered portion 32 is press-fitted into the narrow portion 22 of the groove 21 of the yoke member 20, while the bent portion 33 is inserted into the deep portion 23 of the groove 21 of the yoke member 20. In this way, the teeth 31 are fixed to the yoke member 20. The width of the bent portion 33 of the teeth 31 in the circumferential direction is greater than the width of the narrow portion 22 of the groove 21 of the yoke member 20 in the circumferential direction. The present configuration functions to restrict the teeth 31 from slipping off inward in the radial direction.

Figure 7:
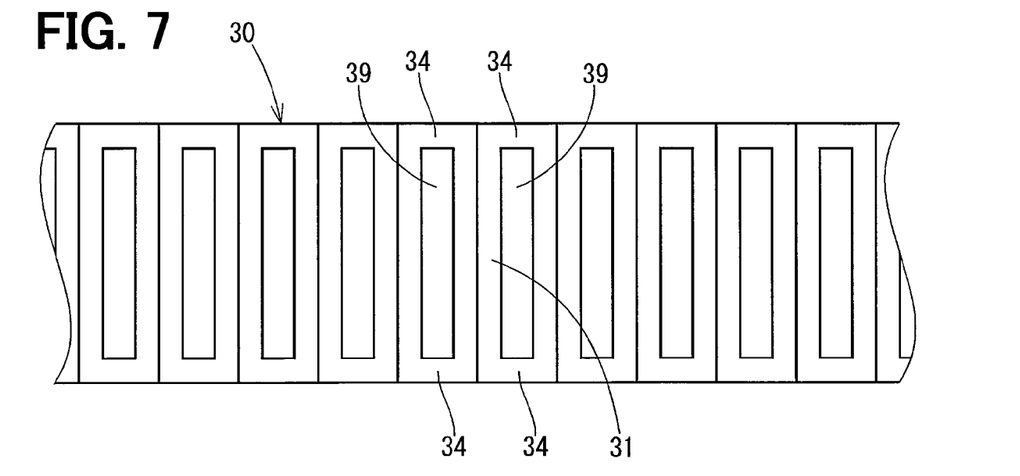
FIG. 7 is a view showing the teeth member when being viewed along an arrow VII in FIG. 3.
Figure 8:
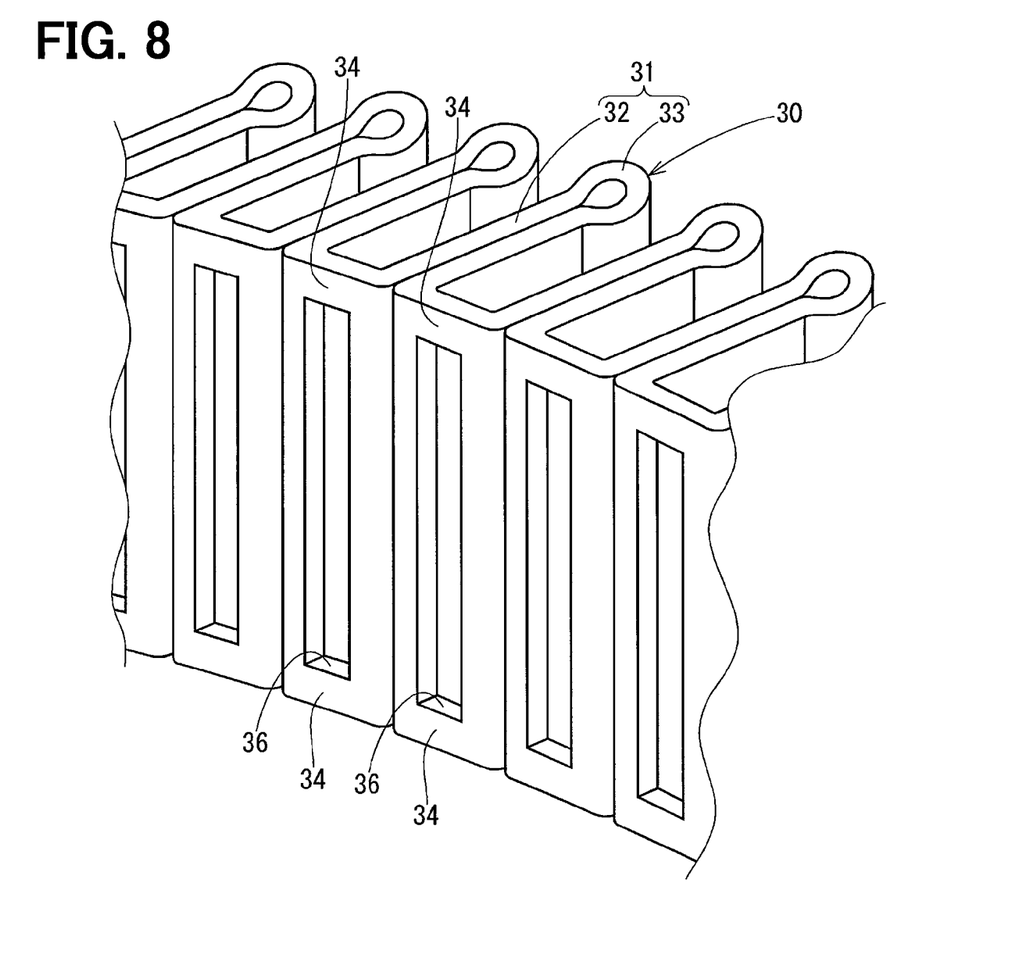
FIG. 8 is a perspective view showing a part of the teeth member in FIG. 3.

As shown in FIGS. 7 and 8, the connecting portions 34 connect two of the teeth 31, which are adjacent to each other in the circumferential direction. Specifically, the connecting portions 34 connect a part of the two teeth 31 in the axial direction. In the present embodiment, a tip end of the first layer of one tooth 31 has one axial end (one end) in the axial direction and an other axial end (other end) in the axial direction. In addition, a tip end of the second layer of one tooth 31 has one axial end in the axial direction and an other axial end in the axial direction. One of the connecting portions 34 connects the one axial end of the tip end of the first layer of one tooth 31 with the one axial end of the tip end of the second layer of another tooth 31. In addition, the other of the connecting portions 34 connects the other axial end of the tip end of the first layer of one tooth 31 with the other axial end of the tip end of the second layer of another tooth 31. The teeth 31 and the connecting portions 34 are formed of the same soft magnetic steel plate.

Figure 9:
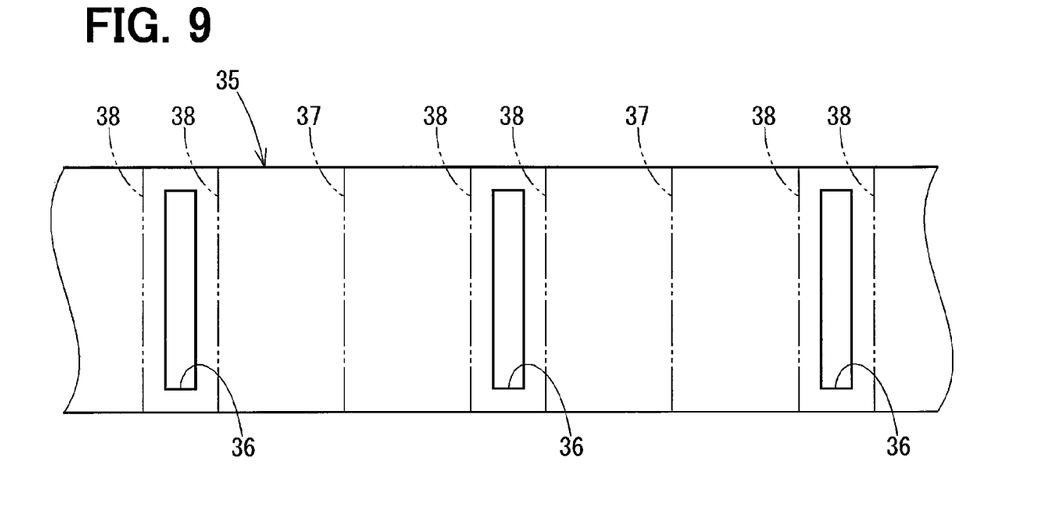
FIG. 9 is an explanatory view showing an intermediate stage of the process to manufacture the yoke member in FIG. 3.

As follows, a manufacturing process of the teeth member 30 will be described. As shown in FIG. 9, slits 36 are formed in a strip-shaped steel plate 35 along the longitudinal direction at predetermined intervals. Each of the slits 36 is an opening extended in the width direction. Subsequently, the strip-shaped steel plate 35 is bent to be in an annular form as shown in FIG. 2. Specifically, a center 37 between the two slits 36, which are adjacent to each other in the longitudinal direction, is bent in a form of mountain fold to form a mountain-folded portion. In addition, a portion 38 between the mountain-folded portion and the slit 36 is bent in a form of a valley fold to form a valley-folded portion. Subsequently, an end of the strip-shaped steel plate 35 is fixed by, for example, crimping, welding, and/or the like. Thus, manufacturing of the teeth member 30 is completed.

Figure 10:
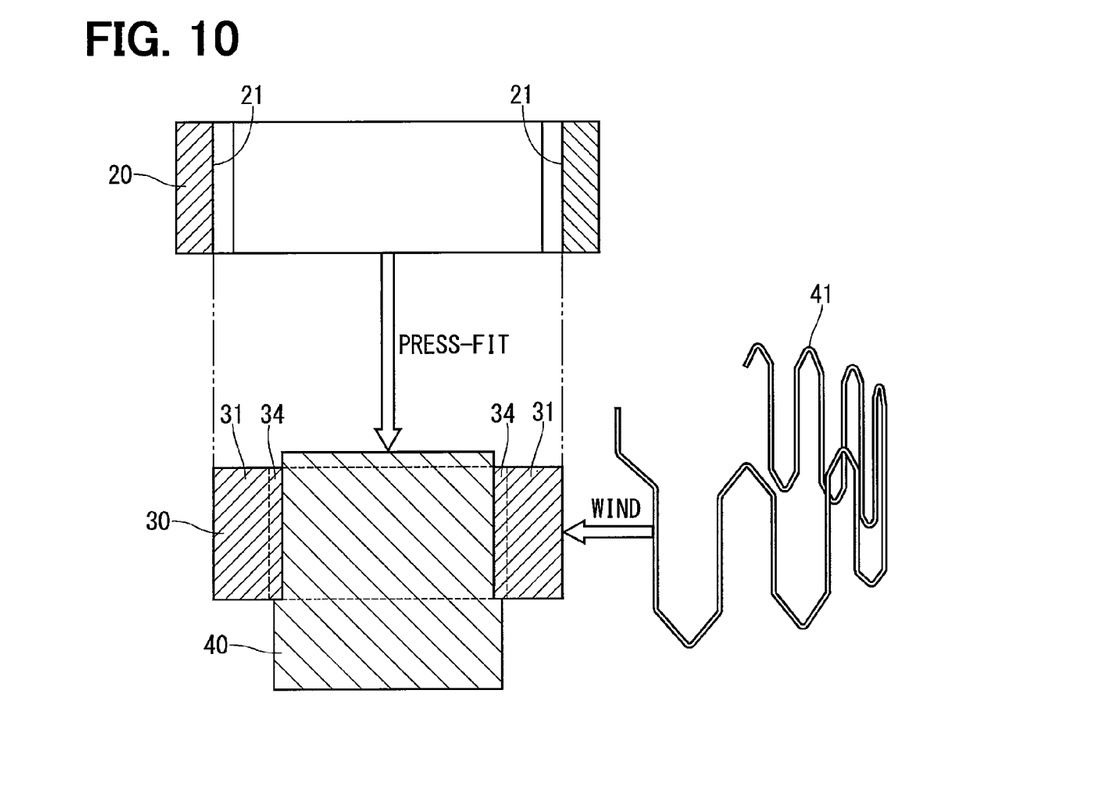
FIG. 10 is an explanatory view showing a process to manufacture the stator core in FIG. 3.

Subsequently, a manufacturing process for the stator core 10 will be described with reference to FIG. 10. First, a jig 40 is caused to hold the teeth member 30 of the stator core 10. In the present state, a group of the teeth 31 is free on the radially outside. Further in the present state, for example, holding projections (not shown) of the jig 40 may be inserted into the slits 36 (refer to FIGS. 7 and 8) of the teeth member 30, respectively, thereby the jig 40 may be caused to hold the teeth member 30.

Subsequently, a lead wire 41 is wound around a slot 39 between the teeth 31. In the present embodiment, the lead wire 41 may be, for example, a rectangular wire. The lead wire 41 may be wound in a form of full-pitch winding and in a form of wave winding. Subsequently, the teeth member 30 and the yoke member 20 are combined, such that the teeth 31 of the teeth member 30 are press-fitted into the grooves 21 of the yoke member 20, respectively. Thus, manufacturing of the stator core 10 is completed.

As described above, the stator core 10 according to the first embodiment includes the yoke member 20 and the teeth member 30, which are separate components from each other. The present configuration enables first to wind the lead wire 41 around the teeth 31. Subsequently, the teeth member 30 and the yoke member 20 are fixed together. In this way, the stator 93 can be manufactured. Therefore, when the lead wire 41 is wound around the teeth 31, the lead wire 41 can be inserted to the teeth 31 from the outside, i.e., external side. Specifically, the lead wire 41 may be inserted between the adjacent two teeth 31 from the radially outside of the teeth 31. Therefore, the present configuration enables to employ, for example, a rectangular wire as the lead wire 41 to form a high-density stator in a form of distributed winding, thereby to enable to reduce noise and oscillation.

In addition, according to the first embodiment, the teeth member 30 is projected radially inward from the annular yoke member 20. The teeth member 30 includes the multiple teeth 31 and the multiple connecting portions 34. The multiple teeth 31 are formed by stacking (laminating) a steel plate by bending along the circumferential direction. The tip end of the tooth 31 has the one axial end in the axial direction and the other axial end in the axial direction. Each of the multiple connecting portions 34 connects the one axial ends of the tip ends of the two teeth 31, which are adjacent to each other in the circumferential direction, together or connects the other axial ends of the tip ends of the two teeth 31, which are adjacent to each other in the circumferential direction, together. In the present configuration, a part of the tip end of the one tooth 31 in the axial direction is connected with a part of the tip end of the other tooth 31 in the axial direction. Therefore, the present configuration enables to reduce magnetic flux, which is short-circuited between the two adjacent teeth 31. Consequently, the present configuration enables to reduce pulsation caused in torque.

In addition, the teeth member 30 according to the first embodiment is formed as follows. Specifically, the slits 36 are opened in the strip-shaped steel plate 24 at the predetermined intervals along the longitudinal direction, such that each of the slits 36 is extended in the width direction. The strip-shaped steel plate 24 is bent in the following manner. Specifically, the center 37 between two slits 36, which are adjacent to each other in the longitudinal direction, is mountain-folded to make a mountain fold and to form the mountain-folded portion. In addition, the portion 38 between the mountain-folded portion and the slit 36 is valley-folded to make a valley fold and to make the valley-folded portion. In this way, the teeth member 30 can be manufactured from the strip-shaped steel plate 24, which is a singular sheet.

In addition, according to the first embodiment, the inner wall of the yoke member 20 has the grooves 21. The number of the grooves 21 is the same as the number of the teeth 31 of the teeth member 30. The grooves 21 are distant from each other in the circumferential direction. Each of the grooves 21 extends in the axial direction. Each of the teeth 31 of the teeth member 30 is fitted to corresponding one of the grooves 21. The present configuration enables to assemble the teeth member 30 and the yoke member 20 together securely. In addition, the present configuration enables to reduce a magnetic resistance between each of the teeth 31 of the teeth member 30 and the yoke member 20, thereby to form a high-efficiency magnetic circuit.

In addition, according to the first embodiment, the outer diameter D (mm) of the yoke member 20 and the number K of the teeth 31 of the teeth member 30 have a ratio K/D therebetween, and the ratio K/D is 1 or more. The present configuration enables to facilitate winding work while maintaining rigidity of the teeth in a case where the teeth are designed at a fine pitch for a small-sized motor.

Second Embodiment

Figure 11:
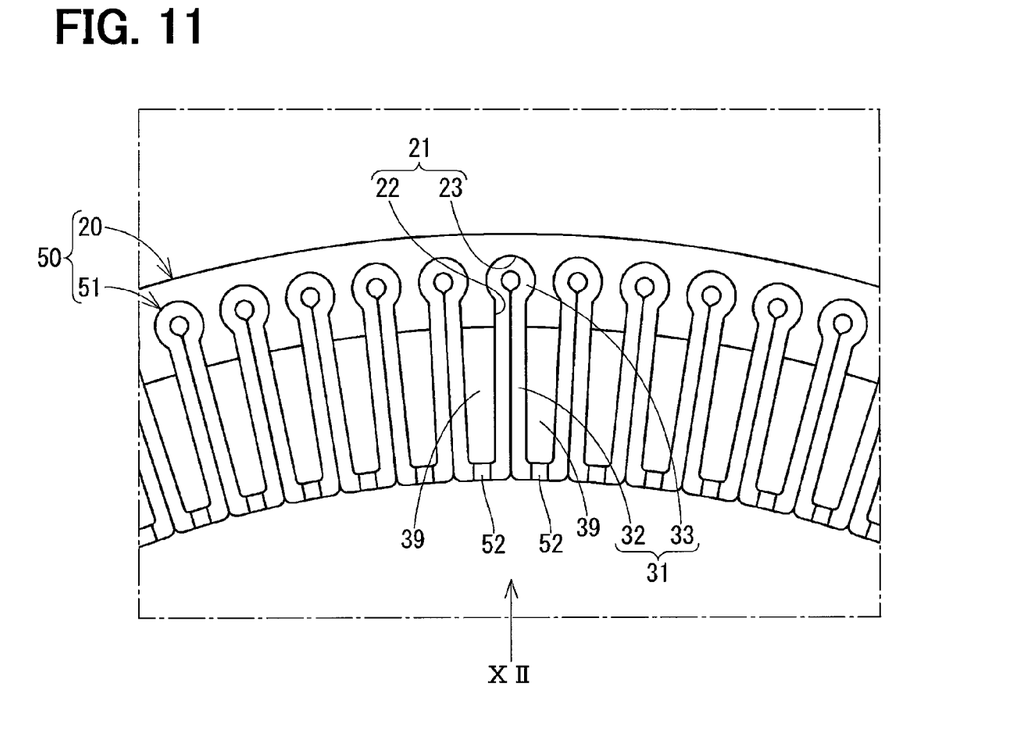
FIG. 11 is a view showing a part of a stator core according to a second embodiment of the present disclosure.
Figure 12:
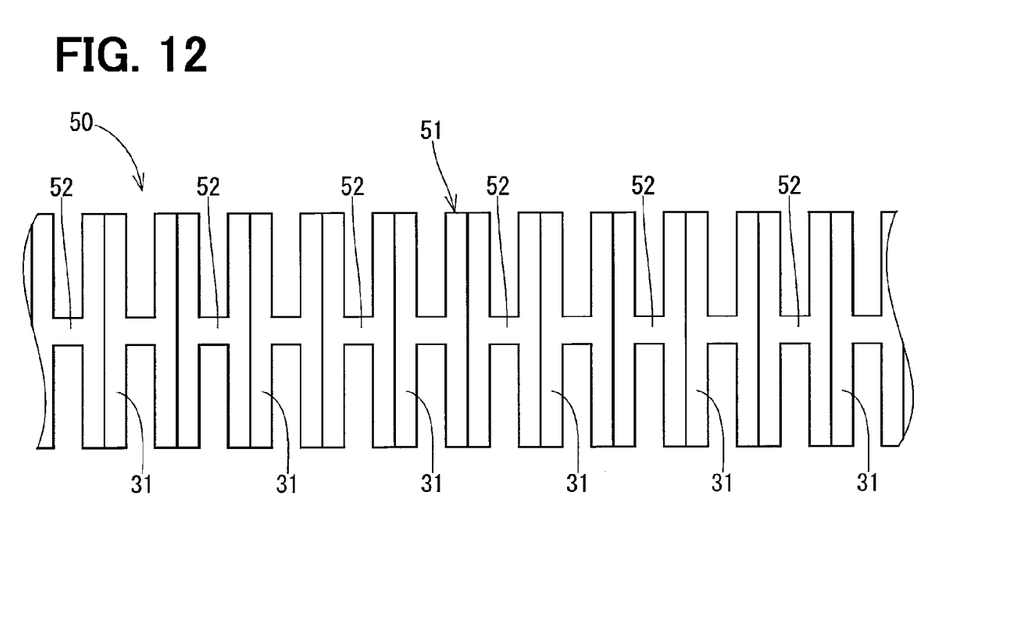
FIG. 12 is a view showing a teeth member when being viewed along an arrow XII in FIG. 11.

As follows, a teeth member 51 of a stator core 50 according to a second embodiment of the present disclosure will be described with reference to FIGS. 11 and 12. The teeth member 51 has connecting portions 52. Each of tip ends of the two teeth 31, which are adjacent to each other in the circumferential direction, has an axial center portions (intermediate portions) in the axial direction. Each of the connecting portion 52 connects the axial center portions of the tip ends of the two teeth 31. Each of the axial center portions (axial intermediate portions) is located substantially at a center position in the axial direction or located at a position excluding the axial end. In the present configuration according to the present embodiment, the axial center portions of the tip ends of the teeth 31 are connected therebetween at the centers of the tip ends in the axial direction. The present configuration also enables to reduce magnetic flux, which is short-circuited between the teeth 31, similarly to the first embodiment. Consequently, the present configuration enables to reduce pulsation caused in torque.

Third Embodiment

Figure 13:
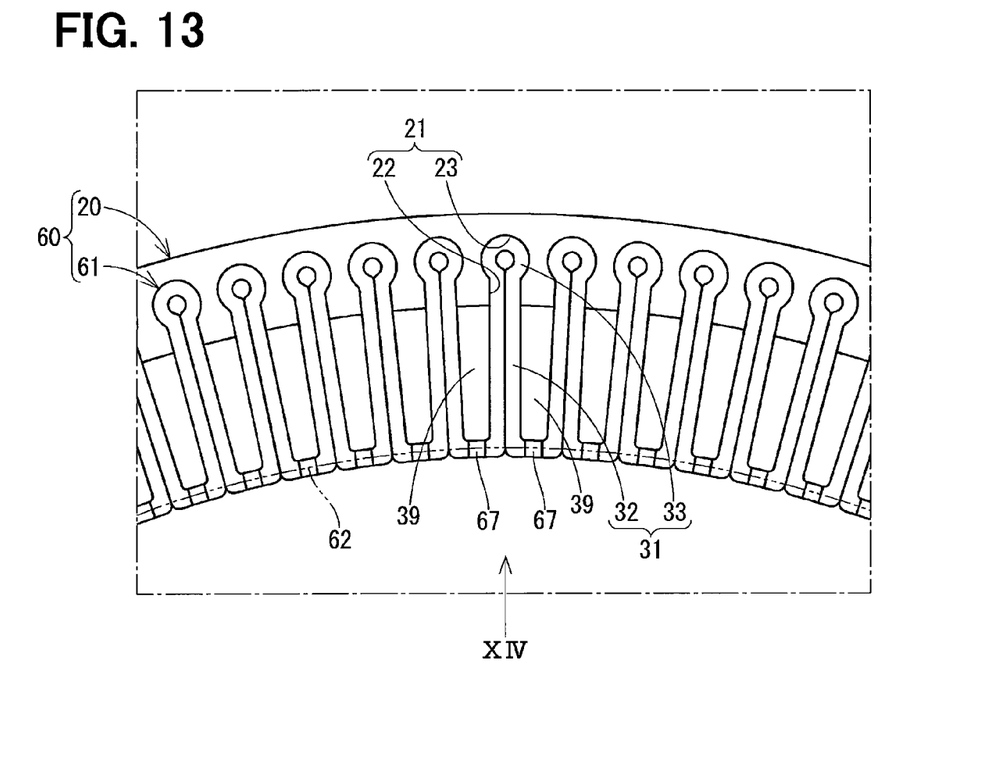
FIG. 13 is a view showing a part of a stator core according to a third embodiment of the present disclosure.
Figure 14:
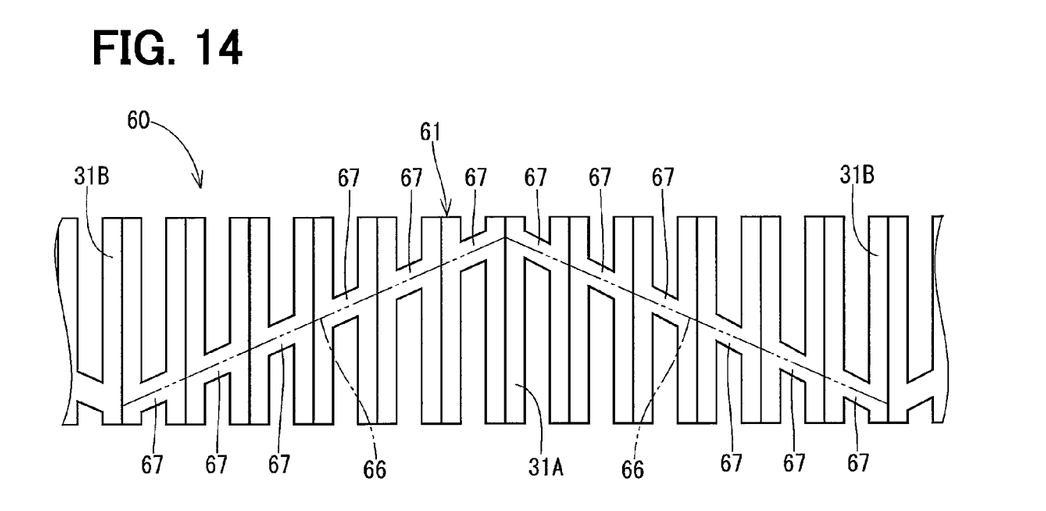
FIG. 14 is a view showing a teeth member when being viewed along an arrow XIV in FIG. 13.

As follows, a teeth member 61 of a stator core 60 according to a third embodiment of the present disclosure will be described with reference to FIGS. 13 and 14. As shown in FIG. 13, in the following description, an imaginary tubular surface 62 may represent, for example, an imaginary tubular surface. The imaginary tubular surface 62 passes through tip ends of the teeth 31. As shown in FIG. 14, one tooth 31A and another tooth 31B may correspond to, for example, a first specific tooth and a second specific tooth, respectively. The one tooth 31A and another tooth 31B are at a predetermined distance from each other in the circumferential direction. As shown in FIG. 14, an imaginary curved line 66 on the imaginary tubular surface 62 may represent, for example, an imaginary curved line. The imaginary curved line 66 connects the axial one end of the tip end of the first specific tooth 31A in the axial direction with the other axial end of the tip end of the second specific tooth 31B in the axial direction.

In FIG. 14, multiple connecting portions 67 reside between the first specific tooth 31A and the second specific tooth 31B. The connecting portions 67 are extended substantially along the imaginary curved line 66. The present configuration according to the third embodiment enables to produce effects similar to those in the first embodiment. Furthermore, the present configuration enables further to reduce pulsation caused in torque by producing a skew effect.

Other Embodiment

According to the above embodiments, the motor is exemplified by a full-pitch distributed winding motor including the stator core with 20 poles and 120 slots. In the example, the outer diameter D of the stator core is 110 (mm). The motor has a configuration in which adjacent teeth are at 30 degrees in electrical angle therebetween. In addition, two pairs of insulated three-phase windings are wound at one slot interval to have a phase difference at 30 degrees. The exemplified motor with relatively a large number of poles is enabled to enhance a torque at a low speed.

It is noted that, the combination of the outer diameter D of the stator core, the number of the poles of the rotor, and the number of the slots of the stator core is not limited to the above-described example.

According to another embodiment, the motor may be a full-pitch distributed winding motor including a stator core with 10 poles and 120 slots, and the outer diameter D of the stator core may be 110 (mm). The motor may have a configuration in which adjacent teeth are at 15 degrees in electrical angle therebetween. In addition, windings of two adjacent slots may be connected in series. In addition, two pairs of three-pole distributed windings may be insulated and may be wound at two-slot intervals to have a phase difference at 30 degrees. Each pole has a phase difference at 15 degrees. The motor having the present configuration may enable to approximate distribution of gap magnetic flux to a sine wave and may be employed in a low-noise and low-oscillation application.

According to other embodiments, the motor may have, for example, a configuration with 16 poles and 96 slots, in which the outer diameter D is 90 (mm), a configuration with 24 poles and 144 slots, in which the outer diameter D is 120 (mm), and/or a configuration with 10 poles and 100 slots, in which the outer diameter D is 90 (mm), and two pairs of 5-phase windings are included. As exemplified above, the present disclosure may be applicable to various forms.

According to another embodiment of the present disclosure, the yoke member may be manufactured by stacking multiple annular plate members.

The stator winding is not limited to the full-pitch winding. According to another embodiment of the present disclosure, the stator winding may be a short-pitch winding. For example, the stator winding may be a short-pitch winding wound around the stator core at, for example, (5/6)π pitch. Specifically, the stator winding may have a configuration in which a one-pole pitch is 6 slots, and a coil pitch is 5 slots.

The rotor is not limited to a surface magnet rotor. According to another embodiment of the present disclosure, the rotor may be an embedded magnet rotor or may be a reluctance rotor, which does not employ a magnet.

According to another embodiment of the present disclosure, the positions the connecting portions of the teeth member may be different from each other in the axial direction.

Application of the motor is not limited to a power source of a vehicular electric power steering. According to another embodiment of the present disclosure, the motor may be employed as an electric motor or a generator for various applications.

The stator core according to the present disclosure is, for example, for the stator of the rotary electric apparatus. The stator core includes the yoke member and the teeth member, which are separate components. The teeth member includes the multiple teeth and the multiple connecting portions. The multiple teeth are projected from the annular yoke member radially inward. The multiple teeth are formed of, i.e., configured with the steel plates, which are stacked along the circumferential direction. For example, the multiple teeth are formed of the steel plates, which may be bent along the circumferential direction to be stacked in the axial direction. At least one of the multiple connecting portions connects a part of the tip end of one of the teeth in the axial direction with a part of the tip end of the another of the teeth in the axial direction. The one of the teeth and the other of the teeth are adjacent to each other in the circumferential direction.

The present disclosure enables to wind the lead wire around the teeth, and thereafter, to fix the teeth member and the yoke member together, thereby to manufacture the stator. Therefore, the lead wire can be inserted into the teeth from the external side of the teeth when the lead wire is wound. The present configuration enables to form a high-density distributed winding stator with the lead wire, such as a rectangular wire. Thus, the present configuration enables to reduce noise and oscillation.

Furthermore, according to the present disclosure, a part of the tip end of one of the tooth in the axial direction is selectively connected with a part of the tip end of an other of the tooth in the axial direction. The present configuration enables to reduce pulsation caused in torque.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure. While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A stator core for a stator of a rotary electric apparatus, the stator core comprising:
   a yoke member substantially being in an annular shape; and
   a teeth member including a plurality of teeth and a plurality of connecting portions, wherein
   the teeth are projected from the yoke member radially inward,
   the teeth are formed of a steel plate stacked along a circumferential direction,
   at least one of the connecting portions connects a part of a tip end of one of the teeth to a part of a tip end of another of the teeth, and
   the one of the teeth and the other of the teeth are adjacent to each other in the circumferential direction, wherein
   at least one of the connecting portions includes
      a first connector that connects one end of the tip end of one of the teeth in the axial direction to one end of the tip end of the other of the teeth in the axial direction, and
      a second connector that connects the other end of the tip end of one of the teeth in the axial direction to the other end of the tip end of the other of the teeth in the axial direction, wherein
   the tip end of the one of the teeth, the tip end of the other of the teeth, the first connector and the second connector together form a slit extending along the axial direction between the first connector and the second connector.

2. The stator core according to claim 1, wherein the teeth member is formed by bending a strip-shaped steel plate.

3. The stator core according to claim 2, wherein
   the teeth member is formed by:
      opening a plurality of the slits in the strip-shaped steel plate at predetermined intervals along a longitudinal direction, such that at least one of the slits extends in a width direction; and
      bending the strip-shaped steel plate, such that
         a center between two of the slits, which are adjacent to each other in the longitudinal direction, is mountain-folded to form a mountain-folded portion, and
         a portion between the mountain-folded portion and corresponding one of the slits is valley-folded.

4. The stator core according to claim 1, wherein
   the yoke member has an inner wall having a plurality of grooves, which are distant from each other in the circumferential direction, wherein at least one of the grooves extends in the axial direction, wherein a number of the teeth is substantially equal to a number of the grooves, and at least one of the teeth is fitted to corresponding one of the grooves.

5. The stator core according to claim 4, wherein
an outer diameter of the yoke member is D mm,
the number of the grooves is K, and
a ratio K/D is greater than or equal to 1.

6. A stator core for a stator of a rotary electric apparatus, the stator core comprising:
a yoke member substantially being in an annular shape; and
a teeth member including a plurality of teeth and a plurality of connecting portions, wherein
the teeth are projected from the yoke member radially inward,
the teeth are formed of a steel plate stacked along a circumferential direction,
at least one of the connecting portions connects a part of a tip end of one of the teeth to a part of a tip end of another of the teeth, and
the one of the teeth and the other of the teeth are adjacent to each other in the circumferential direction, wherein
at least one of the connecting portions connects an intermediate portion of the tip end of one of the teeth intermediate in the axial direction to an intermediate portion of the tip end of the other of the teeth intermediate in the axial direction, wherein
at least one of the connecting portions, the tip end of the one of the teeth, and the tip end of the other of the teeth together form an H-shape with two slits opening toward either side in the axial direction.

7. A stator core for a stator of a rotary electric apparatus, the stator core comprising:
a yoke member substantially being in an annular shape; and
a teeth member including a plurality of teeth and a plurality of connecting portions, wherein
the teeth are projected from the yoke member radially inward,
the teeth are formed of a steel plate stacked along a circumferential direction,
each of the plurality of connecting portions connects a part of a tip end of one of the teeth to a part of a tip end of another of the teeth, and
the one of the teeth and the other of the teeth are adjacent to each other in the circumferential direction, wherein
the teeth includes a first specific tooth and a second specific tooth, which are at a predetermined distance from each other in the circumferential direction,
an imaginary tubular surface passes through a tip end of each of the teeth,
an imaginary curved line on the imaginary tubular surface connects one end of a tip end of the first specific tooth in the axial direction to another end of a tip end of the second specific tooth in the axial direction, and
the plurality of connecting portions between the first specific tooth and the second specific tooth are arranged substantially along the imaginary curved line.

* * * * *